United States Patent [19]
> Mirtain

[11] 3,853,164
[45] Dec. 10, 1974

[54] CUSHIONED TREAD TIRE
[75] Inventor: Henri J. Mirtain, Compiegne, France
[73] Assignee: Uniroyal S.A., Clairoix, France
[22] Filed: May 14, 1973
[21] Appl. No.: 359,935

[30] Foreign Application Priority Data
  May 18, 1972  France .............................. 72.17766

[52] U.S. Cl. .......... 152/361 DM, 152/355, 152/374
[51] Int. Cl. .............................................. B60c 9/18
[58] Field of Search .......... 152/360, 361 R, 361 FP, 152/361 DM, 374, 355

[56] References Cited
UNITED STATES PATENTS

| | | | |
|---|---|---|---|
| 2,020,190 | 11/1935 | Jones................................ | 152/360 |
| 2,786,507 | 3/1957 | Howe et al.......................... | 152/360 |
| 3,083,749 | 4/1963 | Destinay et al. .................. | 152/361 R |
| 3,392,774 | 7/1968 | Le Bosse........................... | 152/361 R |
| 3,481,385 | 12/1969 | Depmeyer et al............... | 152/361 R |
| 3,612,136 | 10/1971 | Gough.............................. | 152/361 R |

Primary Examiner—Drayton E. Hoffman
Attorney, Agent, or Firm—Herbert A. Stern, Esq.

[57] ABSTRACT

A radial ply pneumatic vehicle tire, characterized by uniform tread wear is disclosed. The tire includes a radial ply carcass, first and second sidewalls overlying the lateral portions of the carcass, a tread overlying the crown region of the carcass, a breaker positioned between the tread and the crown region of the carcass and a cushion positioned between the breaker and the tread. The cushion is constituted by a nonreinforced rubber compound having a hardness greater than the hardness of the tread. The cushion extends from a point under the tread to the exterior surface of at least one of said sidewalls, thereby providing a relatively stiff support for at least one tread shoulder by at least one of the sidewalls. This abstract is not to be taken either as a complete exposition or as a limitation of the present invention, however, the full nature and extent of the invention being discernible only by reference to and from the entire disclosure.

11 Claims, 6 Drawing Figures

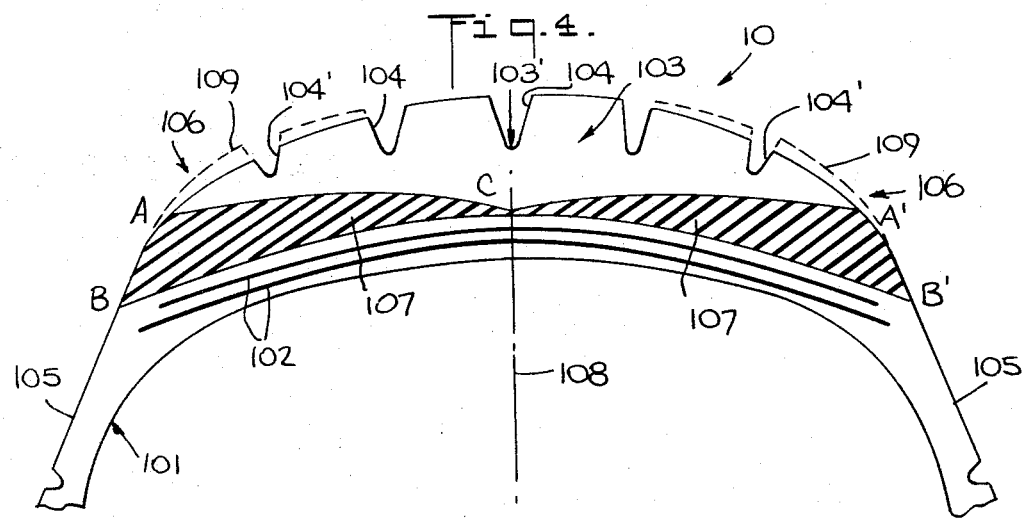
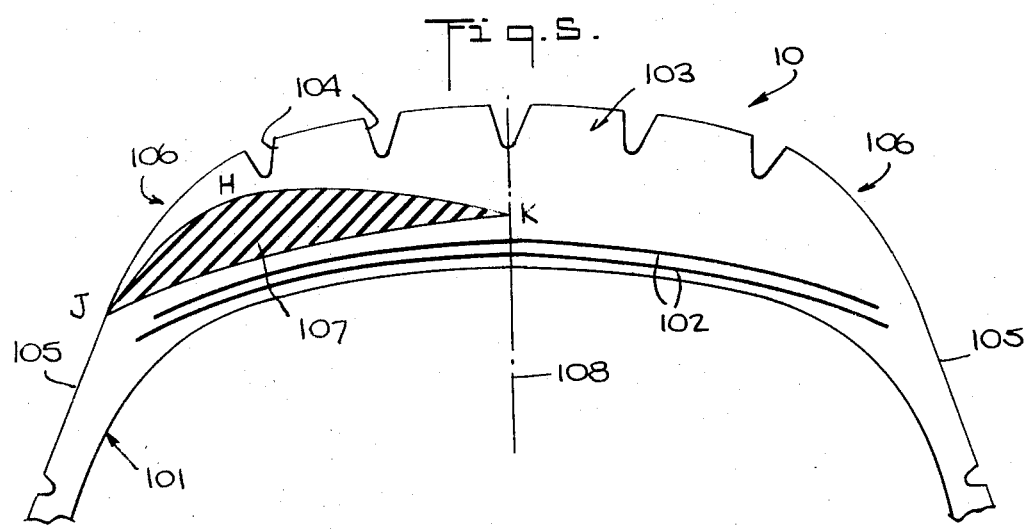
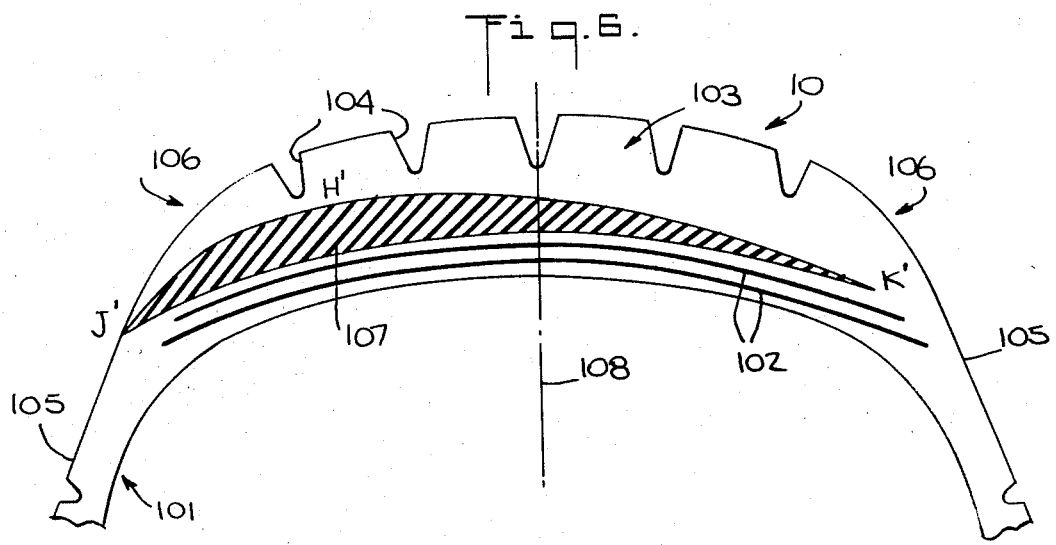

CUSHIONED TREAD TIRE

BACKGROUND OF THE INVENTION

This invention relates to radial ply pneumatic tires for vehicles and more particularly to such tires having inserts between the tread and carcass thereof.

The shoulders or lateral areas of tire treads presently known in the art tend to wear at a greater rate than the central portion of the tread. This necessitates the premature scrapping of such tires due to their total wear in the shoulder area although the central portion of the tread is still satisfactory for substantial additional service. The non-uniform distribution of tread wear is due in great part to the severe conditions of service under which the tire must operate. It is especially due to frequent sharp turns which cause complete wear in the shoulder area before comparable wear occurs in the central portion of the tread.

In an attempt to overcome the drawbacks in presently known tires it has been suggested, for example, that additional rubber incorporated in the areas ares of the tread so that, notwithstanding the fact that this area of the tread wears more quickly than the central area thereof, both the central and lateral portions of the tread will wear out at approximately the same time. This solution however has undesirable side effects. For example, it causes an unwanted weight increase in the shoulder region which increases the heat buildup in the tire, thereby deleteriously affecting tire life. Further, increasing the quantity of material in the shoulder regions serves to increase the cost of manufacture of the tire. Another solution to the instant problem is illustrated in French Patent No. 1,342,992 where the use of inserts in the shoulder region, the inserts being constructed of relatively hard material, is disclosed. This structure, utilizing a fiber reinforced cushion which does not extend to the lateral edges or sidewalls of the tire and which is placed either between the tread and the breaker plies, or between the breaker plies and carcass, or between the two breaker plies, does not provide a completely satisfactory solution to the instant problem. This is because the lack of support for the tread by the sidewalls of the tire allows substantial flexing and concomitant wear in the shoulder region of the tread.

SUMMARY OF THE INVENTION

It is, therefore, an important object of the present invention to provide an improved radial ply tire construction by means of which the aforesaid drawbacks and disadvantages may be most efficaciously avoided.

It is a further object of this invention to provide a radial ply pneumatic tire in which the rate of wear of the tread shoulders is substantially the same as the rate of wear of the central portion of the tread.

Generally speaking the objectives of the present invention are attained by the provision of a pneumatic vehicle tire comprising a radial ply carcass, first and second sidewalls overlying the lateral portions of the carcass, a tread overlying the crown region of the carcass, a breaker interposed between the tread and the crown region of the carcass in circumferentially surrounding relation to the latter, and a cushion constituted by a nonreinforced rubber compound interposed between the breaker and the tread and extending from a point under the tread to the exterior surface of at least one of the sidewalls, the cushion having a hardness greater than the hardness of the tread, thereby providing for relatively stiff support of the tread region thereof by at least one of the sidewalls.

BRIEF DESCRIPTION OF THE DRAWINGS

The foregoing and other objects of features of the present invention will be more clearly understood from the following detailed description thereof when read in conjunction with the accompanying drawings, in which:

FIGS. 4 – 6 are sectioned axial views of three embodiments according to the invention which may be utilized when at least one of the lateral areas of the tread is wearing at a slower rate than the central portion thereof.

DESCRIPTION OF THE PREFERRED EMBODIMENT

Figure 1:
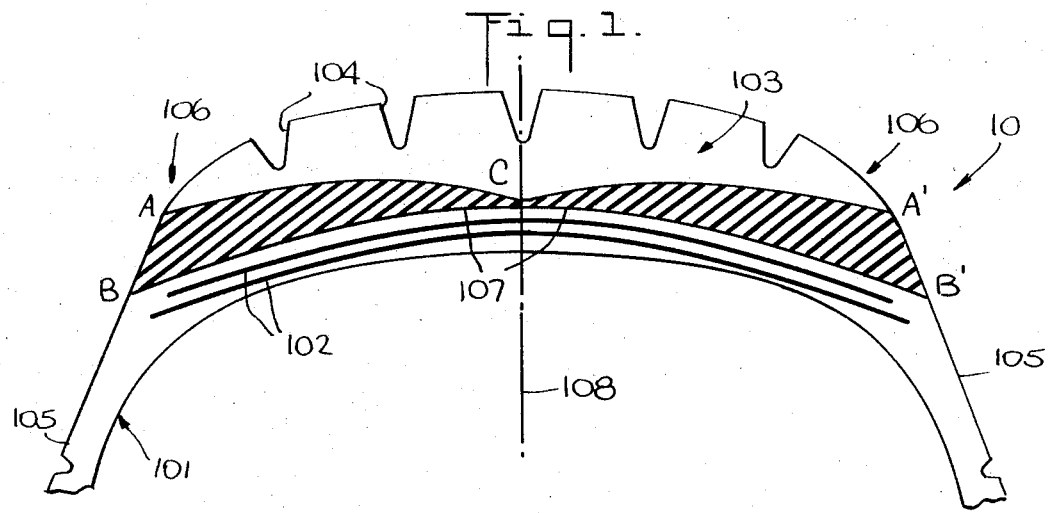
FIG. 1 illustrates a sectioned axial view of a belted radial ply tire according to the invention.

Referring now to FIG. 1 there is shown a cross-sectioned axial view of a tire 10 constructed according to the invention. The tire includes a carcass 101 of radial ply construction and two breakers or belts 102. Belts 102 are superposed one on the other and both are positioned between the crown region of the carcass and a tread 103 for reinforcing the latter. The tread 103 is formed with a plurality of traction grooves 104 in a manner customary in the art. Tread 103 is separated from sidewalls 105 in the area of shoulders 106 by a cushion 107, cushion 107 to be discussed in detail below. The tire illustrated is symmetrical relative to its median equatorial plane 108 although this is not necessary and the instant invention is equally applicable to tires which are asymmetrical with respect to their median equatorial plane.

In FIG. 1 cushion 107 is illustrated, in crossection, as being comprised by two triangles, A, B, C, and A', B', C which are substantially symmetrical with respect to the median equatorial plane 108 of the tire 10 and are in abutting relation at their common apex C. Cushion or padding 107 is composed of a non-reinforced compound which is harder than the rubber forming tread 103. For example, cushion 107 may be comprised of a rubber mixture constituted by approximately 90 percent natural rubber, 10 percent butadiene rubber, 90 percent carbon black, 5 percent sulphur and have a hardness of between 85 and 88 Shore A° units while the compound utilized in manufacturing the tread has a Shore A° hardness of between 58 and 62.

Figure 2:
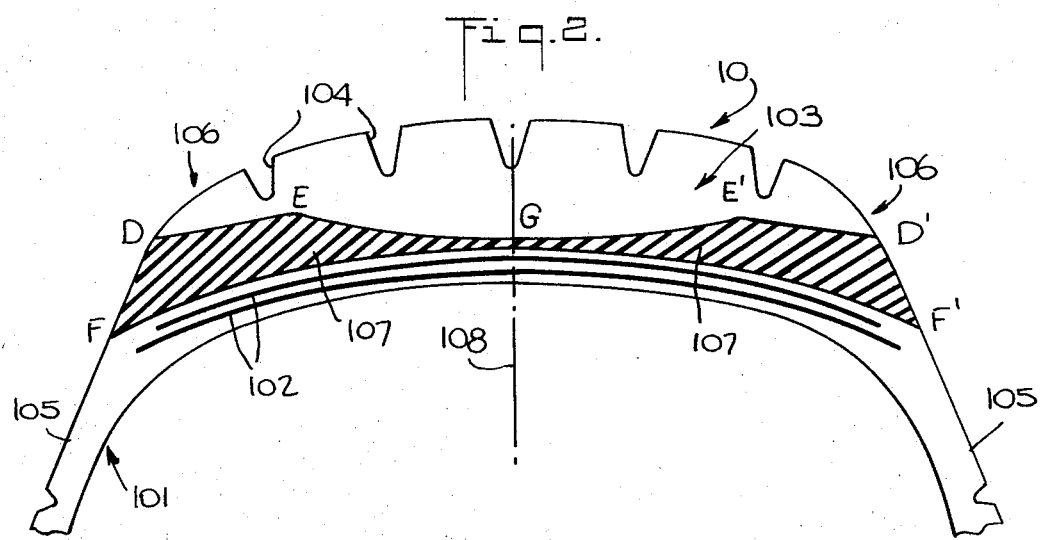
FIGS. 2 and 3 are sectioned axial views illustrating modifications of a belted radial ply tire constructed according to the invention.

Turning now to FIG. 2, where as in the remaining Figures, like numerals are utilized to indicate like portions of the inventive tire structure, the cushion 107, as illustrated in cross-section, comprises two curvilinear trapezoidal quadrilaterals, D, E, G, F, and D', F', G, E, respectively, the two curvilinear quadrilaterals abutting at their common region G. It will be noted that in the embodiment illustrated in FIG. 1, the axially outward sides A, B and A', B' of the triangles, and in the embodiment illustrated in FIG. 2, the axially outward sides D, F and D', F' of the curvilinear trapezoids extend to the lateral or outside walls of tire 10, thereby separating sidewalls 105 from tread 103. These axially outward sides thus form a circular band in the lateral portion of the tire between the radially outwardmost portion of the sidewalls and the shoulders of the tread.

The radial thickness of the cushions 107 illustrated in both FIGS. 1 and 2 vary in such manner that they are thickest in the shoulder region of the tread and are of minimum thickness at their abutment points i.e. in the area of the equatorial plane of the tire. Thus, in FIG. 1, the sides A-C and A'-C of cushion 107 are convex in a radially outward direction, i.e., toward the tread 103 of tire 10 and in FIG. 2 the sides D-E, and D'-E' of the cushion 107 extend only in the area of shoulders 106 while sides E-G and E'-G are convex in a radially inward direction, i.e., away from the tread 103.

Figure 3:
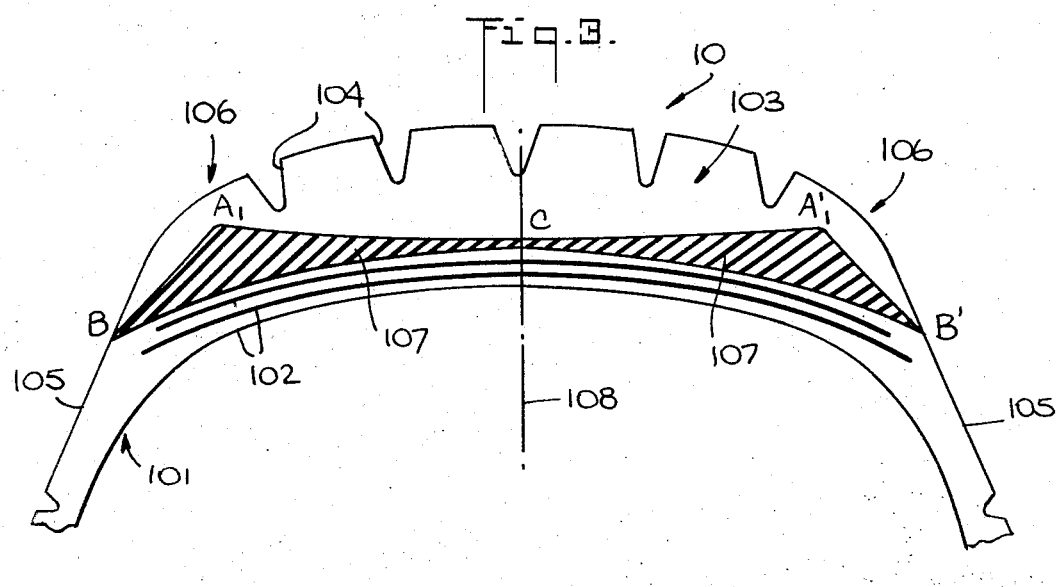

A third embodiment of a radial ply tire having a cushion 107 constructed according to the invention is illustrated in FIG. 3. Cushion 107 comprises, in cross section, two generally triangular portions $A_1$, B, C, and $A'_1$, B', C. The radially thickest portions of the two triangles are located at apexes $A_1$ and $A'_1$ in the respective shoulder regions 106 of tread 103. The apexes B and B' of the two triangles extend to the lateral or outside walls of the tire 10 separating the sidewalls 105 from the shoulders 106. The embodiment of the cushion 107 illustrated in FIG. 3 differs in this regard from the embodiments illustrated in FIGS. 1 and 2 in that in the latter two embodiments a full side of the cushion extended to the lateral or outside walls of the tire. The embodiment illustrated in FIG. 3 is similar, however, to the embodiments illustrated in FIGS. 1 and 2 in that the radially thickest portion of cushion 107 occurs in the region of the shoulders 106 and at least one of the radially thinnest portions of the cushion 107 occurs in the region of median equatorial plane 108. It is here appropriate to note that in the three embodiments thus far illustrated, and in the embodiments yet to be illustrated, the sides of each cushion may be either rectilinear or curvilinear and, if curvilinear, may be either convex or concave.

FIGS. 4, 5 and 6 are axial cross-sectional views of the embodiments of the invention which may be advantageously utilized when at least one tread shoulder is wearing at a slower rate than the central portion of the tread. Turning now to FIG. 4, it is seen that the problem of excessive wear in the central portion 103' of the tread is remedied by the elimination of a portion of the tread rubber in the region of both shoulders 106, as indicated by the dashed zone 109. This results in lateral tread grooves 104' having less depth than grooves 104 and also results in a tire which utilizes less tread rubber and which is therefore less expensive to manufacture than tires utilizing conventional treads. In FIG. 4 the cushion 107 is shown, in cross-section, as being comprised of two triangles A, B, C, and A', B', C, a configuration similar to that illustrated in FIG. 1. This configuration, however, need not necessarily be used and cushion 107 could utilize as well either of the configurations illustrated in FIGS. 2 and 3.

In FIGS. 1 through 4 cushion 107 has been illustrated as being substantially symmetrical relative to the median equatorial plane 108 of the tire. In the embodiments illustrated in FIGS. 5 and 6 cushion 107 is illustrated as being asymmetrical relative to the median equatorial plane 108 of the tire 10, and these two embodiments have been found to be particularly useful where one tread shoulder undergoes a substantially greater amount of wear then either the central portion of the tread or the other shoulder thereof.

Turning now to FIG. 5, cushion 107 is illustrated, in cross-section, as having a crescent-like configuration, the apexes of the crescent being indicated at J and K. Apex K is located in the median equatorial plane 108 of the tire and apex J extends to one lateral or outside wall of tire 10, separating one sidewall 105 from its corresponding shoulder 106. It will be noted that in this embodiment as in the other embodiments previously discussed, the radially widest part of cushion 107 is located in the shoulder region 106 of tread 103, the radially widest part of the cushion 107 being indicated at H.

Turning now to FIG. 6 there is illustrated a cushion 107 which also has, in cross-section, a crescent-like configuration. The apexes of this cushion are indicated at J' and K' and the radially widest part of the cushion is indicated at H' in the region of one shoulder 106 of tread 103. Cushion 107 extends, as indicated at J', from one lateral or outside wall of tire 10, thereby separating one sidewall 105 from its corresponding shoulder 106, to apex K' positioned beyond the median equatorial plane 108 of the tire at a point below opposite shoulder 106.

As stated above, the embodiments illustrated in FIGS. 5 and 6 are particularly useful when one shoulder suffers from substantially greater wear than the other as, for example, when a driver does not regularly rotate his tires during service.

It is here noted that although six specific embodiments have been illustrated it will be clear to those skilled in the art that asymmetric cushions as illustrated in FIGS. 5 and 6 could be utilized together with the teaching of FIG. 4 with regard to the removal of a layer of tread rubber in the shoulder regions, while the trapezoidal cushion of FIG. 2 and either of the triangular cushion illustrated in FIGS. 1 and 3 could be substituted for the cushions illustrated in FIGS. 5 and 6.

It will be understood that the foregoing description of the preferred embodiments of the invention is for purposes of illustration only, and that the various structural and operational features as herein disclosed are susceptible to a number of modifications and changes, none of which entail any departure from the spirit and scope of the present invention as defined in the hereto appended claims.

Having thus described the invention, what is claimed and desired to be protected by Letters Patent is:

1. A pneumatic vehicle tire comprising:
   a radial ply carcass;
   first and second sidewalls overlying the lateral portions of said carcass;
   a tread overlying the crown region of said carcass;
   a breaker interposed between said tread and said crown region of said carcass in circumferentially surrounding relation to the latter; and
   a cushion constituted by a non-reinforced rubber compound interposed between said breaker and said tread and extending from a point under said tread to the exterior surface of at least one of said sidewalls;
   said cushion having a hardness greater than the hardness of said tread, thereby providing for relatively stiff support of the tread shoulder by said at least one of said sidewalls.

2. A pneumatic vehicle tire according to claim 1, wherein said cushion is symmetrical about the median equatorial plane of the tire.

3. A pneumatic vehicle tire according to claim 2, wherein the radial thickness of said cushion is a maximum in the shoulder region of said tread and is a minimum in the area of the median equatorial plane of the tire.

4. A pneumatic vehicle tire according to claim 3, wherein said cushion is configured, in axial cross-section, by two symmetrical triangles, an apex of one triangle abutting an apex of the other triangle at the median equatorial plane of the tire.

5. A pneumatic vehicle tire according to claim 4, wherein one side of each of said triangles is positioned at one of the outside walls of said tire, thereby forming an annular band in each of said outside walls separating said tread from said sidewalls.

6. A pneumatic vehicle tire according to claim 4, wherein one apex of each of said triangles is positioned at one of the outside walls of said tire, thereby separating said tread from said sidewalls.

7. A pneumatic vehicle tire according to claim 3, wherein said cushion is configured, in axial cross-section, by two symmetrical curvilinear trapezoidal quadrilaterals, an apex of one quadrilateral abutting an apex of the other quadrilateral at the median equatorial plane of the tire.

8. A pneumatic vehicle tire according to claim 7, wherein one side of each of said quadrilaterals is positioned at one of the outside walls of said tire, thereby forming an annular band in each of said outside walls separating said tread from said sidewalls.

9. A pneumatic vehicle tire according to claim 1, wherein said cushion is configured, in axial cross section, as a crescent, one apex of said crescent being positioned at one of the outside walls of said tire and the other apex thereof being positioned in the median equatorial plane of the tire, the radial thickness of said cushion being a maximum in the shoulder region of said tread.

10. A pneumatic vehicle tire according to claim 1, wherein said cushion is configured, in axial cross-section, as a crescent, one apex of said crescent being positioned at one of the outside walls of said tire and the other apex thereof being positioned in the region of the tread shoulder opposite said one outside wall, the radial thickness of said cushion being a maximum in the region of the tread shoulder adjacent said one outside wall.

11. A pneumatic vehicle tire according to claim 1, wherein the rubber compound constituting said cushion has a hardness rating of between about 85 and about 88 Shore A° units and said tread has a hardness rating of between about 58 and about 62 Shore A° units.

* * * * *

UNITED STATES PATENT AND TRADEMARK OFFICE
CERTIFICATE OF CORRECTION

PATENT NO. : 3,853,164
DATED : December 10, 1974
INVENTOR(S) : Henri J. Mirtain

It is certified that error appears in the above—identified patent and that said Letters Patent are hereby corrected as shown below:

Column 1, line 22, after "rubber" insert --be--; after "the" insert --lateral--; delete "ares".

Column 2, line 41, delete "crossection" and substitute --cross-section-- therefor; line 59, delete "E", second occurrence and substitute --E'-- therefor.

Signed and Sealed this first Day of June 1976

[SEAL]

Attest:

RUTH C. MASON
Attesting Officer

C. MARSHALL DANN
Commissioner of Patents and Trademarks